E. BARTON.
TOY TREE HOLDER.
APPLICATION FILED SEPT. 3, 1907. RENEWED MAY 8, 1909.
926,638.
Patented June 29, 1909.
2 SHEETS—SHEET 2.
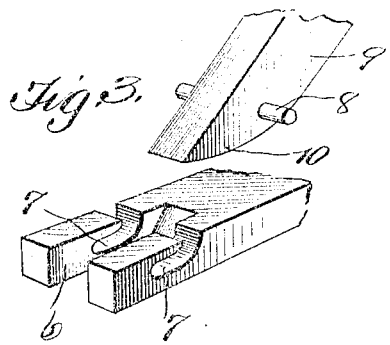
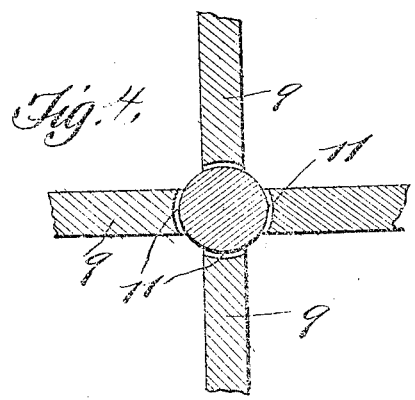
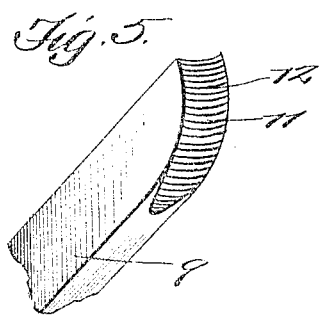
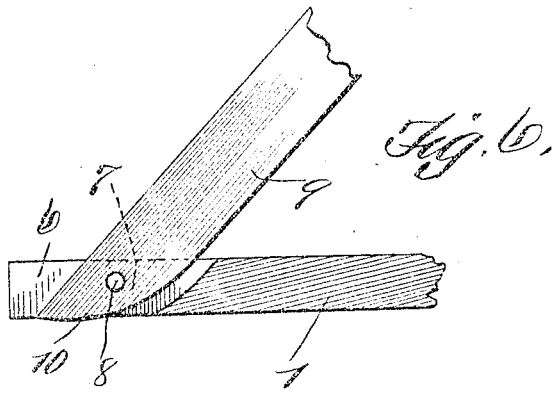
Witnesses
Inventor
E. Barton
By D. Swift & Co.
Attorneys

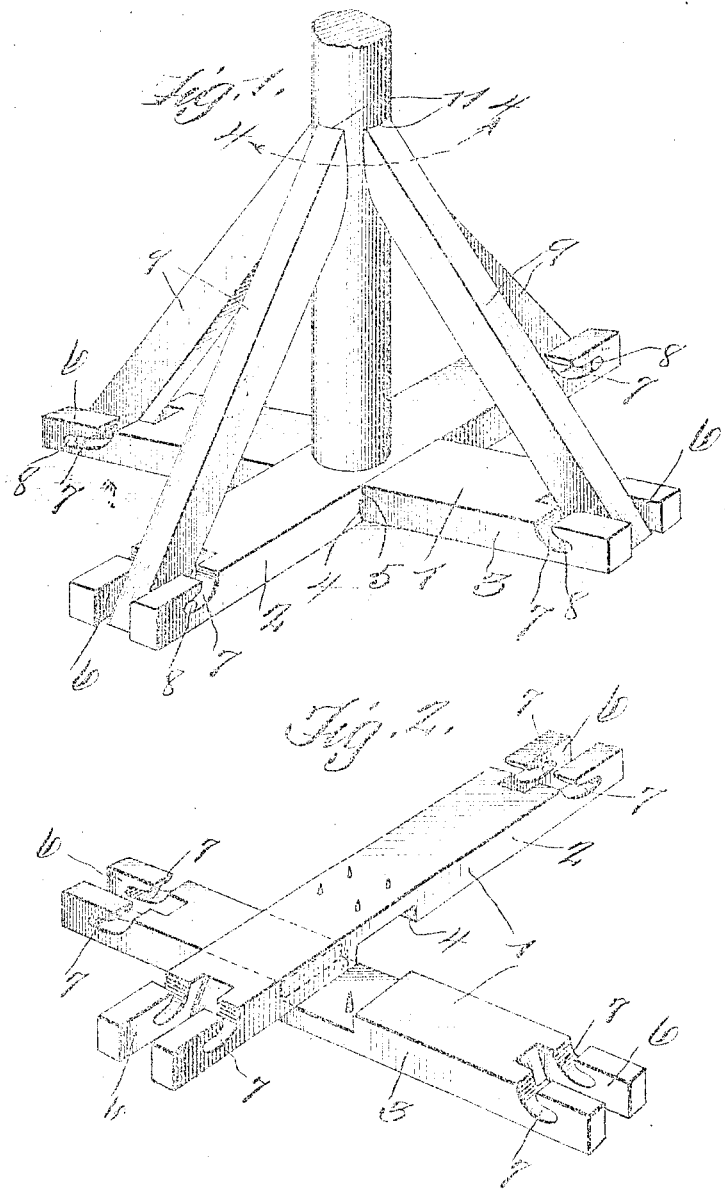

UNITED STATES PATENT OFFICE.

EDMUND BARTON, OF IVYLAND, PENNSYLVANIA.

TOY TREE-HOLDER.

No. 926,638.

Specification of Letters Patent.

Patented June 29, 1909.

Application filed September 3, 1907, Serial No. 391,193. Renewed May 8, 1909. Serial No. 494,924.

*To all whom it may concern:*

Be it known that I, EDMUND BARTON, a citizen of the United States, residing at Ivyland, in the county of Bucks and State of Pennsylvania, have invented a new and useful Toy Tree-Holder; and I do hereby declare the following to be a full, clear, and exact description of the invention, such as will enable others skilled in the art to which it appertains to make and use the same.

This invention pertains to a new and useful tree holder or support; in its broadest aspect the invention has for its object to provide a simple and efficient device of this character, by which a tree may be held perpendicular, without the use of adjusting nuts and rings, as will be clearly seen from an observation of the drawings.

The invention aims as a further object to provide a base consisting of cross arms, the extreme ends of which are bifurcated, and the arms formed by said bifurcations are provided with recesses or bearings to receive the lugs or pivots of the inclined supporting braces, as shown clearly in the drawings. The lower ends of these inclined supporting braces are provided with cam surfaces, to cause them to engage the surface upon which the base is disposed, so as to throw their upper free ends toward the tree or other object to be supported; in this manner the tree or other object is held perfectly erect, through the medium of the weight of the tree or other object upon the base, as will be clearly manifest.

This invention comprises further objects and combinations of elements which will be hereinafter more fully described, shown in the accompanying drawings, and the novel features thereof will be pointed out by the appended claims.

To obtain a full and correct understanding of the details of construction, combinations of features, elements and advantages, reference is to be had to the accompanying drawings in connection therewith, wherein—

Figure 1 is a perspective view of the improved tree holder or support showing the same supporting a tree. Fig. 2 is a perspective view of the cross arms forming the base, showing the same separated. Fig. 3 is a detail view showing one end of one of the cross arms, and one of the inclined supporting braces showing the manner of connection between the braces and the arms. Fig. 4 is a sectional view on line 4—4 of Fig. 1 illustrating the construction of the upper ends of the supporting braces. Fig. 5 is a detail view of the upper end of one of the supporting braces. Fig. 6 is a sectional view on line 6—6 of Fig. 1 illustrating the cam surface upon the lower end of one of the supporting braces, to show clearly how the said brace is forced toward the tree or object to be held erect.

Making renewed reference to the accompanying drawings, wherein similar reference characters indicate corresponding parts in the several illustrations, by figures, 1 designates the base of the holder, which consists of two members 2 and 3 which are recessed, as at 4 and 5, which recesses are constructed so as to cause the members to engage one another, in such wise as to cause their upper and lower faces to be flush with one another. The cross arms when connected in this manner are fastened together by screws, as clearly shown. Projecting from one of the cross arms are several serrations or pointed projections to engage the lower end of a tree, as will be clearly understood. The extreme ends of each arm are bifurcated, as at 6, the arms formed by said bifurcations are provided with recesses or bearings 7 to receive the lugs or pivots 8 carried by the lower end of the inclined supporting braces 9, as is clearly illustrated in the drawings. These lugs or pivots carried by the braces may be readily removed from the bearings when the parts of the holder are disassembled, for the purpose of being packed in a small compass for shipment or storage. The lower ends of the braces 9 are provided with cam surfaces 10 to engage the surface upon which the base is disposed, so as to cause the upper ends of the said braces to lean toward the tree to be supported, so as to securely clamp the same. The upper ends of the braces are curved or grooved out as at 11, to conform to the contour of a tree, so as to form a snug engagement therewith, or any other suitable configuration may be provided at the upper ends of said braces suitable to the object to be supported. The recesses or grooved out portions at the upper ends of said braces are provided with pointed lugs or projections 12 to engage the surface of the object to be held erect, as will be clearly observed in the drawings. It will be seen that the cams of the lower ends of the braces cause the same to lean toward the object to be held erect by the pressure of the object, upon the base, as will be clearly manifest.

It is to be understood that various changes and modifications may be employed in the construction and embodiment thereof, combinations of features, and elements, without in any way departing from the spirit and scope of the invention covered by the claims thereof; it being understood that whatever variations or modifications are employed must fall within the scope of the appended claims.

From the foregoing, the essential features, elements and the operation of the device, together with the simplicity thereof, will be clearly apparent.

Having thus described the invention, what is claimed as new and useful by the protection of Letters Patent, is:—

1. In a device as set forth, inclined supporting braces, a base therefor comprising crossing members, the extreme ends of which are provided with bifurcations, said braces having cams at their lower ends to cause the same to lean toward an object to be clamped by the pressure thereof upon the base, and means to form a pivotal connection between the lower ends of said braces and the bifurcations, so as to allow of a ready disconnection of the braces.

2. In a holder for supporting an object, inclined supporting braces, a base therefor comprising crossing members, the extreme ends of which are provided with bifurcations, said braces having cams to cause the same to clamp the object to be supported, said bifurcations forming arms provided with recesses or bearings, the said braces having lugs or pivots to engage said bearings.

3. In a holder for supporting an object, inclined supporting braces, a base therefor comprising crossing members, the extreme ends of which are provided with bifurcations, said braces having cams at their lower ends to cause the same to clamp an object to be supported by pressure thereof upon the base, said bifurcations forming arms provided with recesses or bearings, the said braces having at their lower ends lugs or pivots to engage said bearings, said base having serrations to be engaged by the lower end of an object to be supported, said braces having at their upper ends grooved out and curved portions to engage the object to be supported, as specified.

In testimony whereof I have signed my name to this specification in the presence of two subscribing witnesses.

EDMUND BARTON.

Witnesses:
SAMUEL A. RISLEY,
WILLIAM K. BARTON.